Feb. 16, 1954
P. A. MANKIN
2,669,359
LIQUID FILTER
Filed June 10, 1950
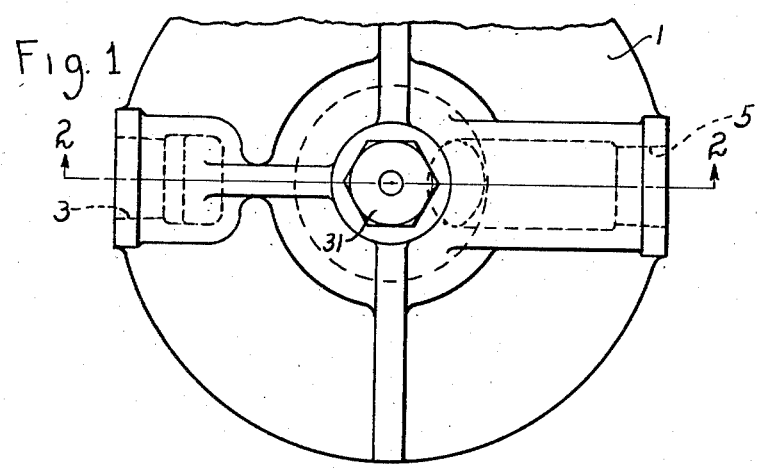
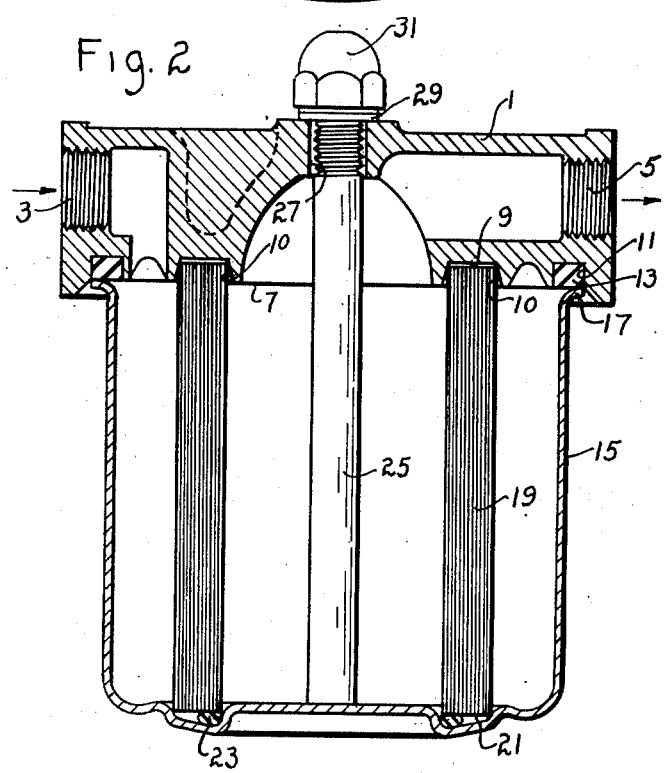
PAUL A. MANKIN
    INVENTOR.
BY Edmund W. E. Kamm
        ATTORNEY Patented Feb. 16, 1954

2,669,359

UNITED STATES PATENT OFFICE 2,669,359

LIQUID FILTER

Paul A. Mankin, Fort Wayne, Ind., assignor to Bowser, Inc., Fort Wayne, Ind., a corporation of Indiana Application June 10, 1950, Serial No. 167,355

2 Claims. (Cl. 210—183)

This invention relates to a liquid filter. More specifically, it relates to a relatively small filter such as is used to filter the fuel oil passing to an oil burner.

It is an object of the invention to produce a filter which is inexpensive to manufacture.

Another object is to provide a filter in which a positive seal is established at both ends of the filter element and also between the bowl and head.

A further object of the invention is to provide a filter which is easy to assemble and to take apart.

These and other objects will become apparent from a study of this specification and the drawings which are attached hereto, made a part hereof and in which:

Figure 1 is a plan view of the filter.

Figure 2 is a vertical, sectional view taken substantially on the line 2—2 of Figure 1 showing the fluid passages, filtering element and the sealing means.

Referring to the drawings, the numeral 1 represents the filter head which has the inlet passage 3 and an outlet passage 5. The head is provided on its lower face 7 with outer and inner annular grooves 9 and 11.

Groove 9 has tapered side walls 10 which converge away from the face 7 while the side walls of groove 11 are cylindrical. A gasket 13 is disposed in the groove 11 and a bowl 15 which is preferably of drawn metal and has an outwardly flared rim 17 is held in sealing engagement with the gasket.

A filter element 19 which is preferably made of phenolic formaldehyde resin-impregnated paper, formed into a convolute roll and bonded into a unitary cylinder by polymerizing the resin, has one end compressed in the groove 9. Obviously any other suitable filter element may be used.

An annular groove indicated generally by numeral 21 is formed in the bottom of the bowl 15. This groove has tapered inner and outer walls which assist in centering the element. The bottom of the groove is also sloped downwardly and inwardly so that it is deeper adjacent the inner edge and an annular ring 23 of synthetic rubber or other yieldable material is seated in the deepest portion of the groove.

A stud 25 is fixed to the bottom of the bowl, centrally thereof, and projects upwardly through a central hole 27 in the head 1. A gasket 29 is mounted on the stud externally of the head and an acorn nut 31 is applied to the threaded end of the stud to draw the flange 17 of the bowl into sealing relation with gasket 11, the seal ring 23 into sealing relation between the bowl and filter element 19, the other end of the filter element into sealing relation in the groove 10 and the gasket 29 into sealing relation between the head and nut 31.

It will be seen that since a yieldable seal is provided both between the bowl and the filter element and between the bowl and the head, the control of the dimensions of the filter element and the bowl, in the direction of movement as the stud is drawn up, need not be closely controlled.

In other words, the filter element 19 is a rather rigid structure and so is the bowl and if only one resilient seal were used between the head and bowl as is usually done, the element would frequently either be crushed or no seal would be obtained unless the relative lengths of the bowl and element were closely controlled. By using the second yieldable gasket 23, this close control of the relative lengths of the element and bowl is unnecessary.

The flow of liquid in this unit is from the inlet 3 downwardly into the bowl, through the filter element, upwardly inside of the element and through the filtrate outlet 5.

To replace the filter element it is necessary merely to remove nut 31 and drop the bowl 15. The filter element is then removed from the head 1 and a new one substituted. The bowl is then replaced and the nut tightened. Thus the filter cartridge may be quickly and easily replaced without disturbing any conduit connections.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter, the combination of a head, a pair of concentric grooves formed in the head, a relatively rigid filter element having one end mounted in one groove and a resilient gasket in the other, an open-ended bowl, means for drawing and holding the open end of the bowl in sealing relation with said gasket, an annular groove in the bottom of the bowl below the other end of said element wide enough to receive the end of the cartridge and deeper at one side than the other, and an annular, yieldable gasket of circular cross-section disposed in the latter groove at the deep side thereof, between the bowl and the filter element.

2. In a filter, the combination of a head, a pair of concentric grooves formed in the head, a relatively rigid filter element having one end mounted in one groove and a resilient gasket in the other, an open-ended bowl, means for drawing and holding the open end of the bowl in sealing relation with said gasket, an annular groove in the bottom of the bowl wide enough to receive the end of the cartridge and deeper at one side than the other, and an annular, yieldable gasket, of substantially circular cross section, disposed in the latter groove at the deep side thereof, between the bowl and the filter element.

PAUL A. MANKIN.

References Cited in the file of this patent

UNITED STATES PATENTS

| Number | Name | Date |
|---|---|---|
| 817,252 | Kneuper | Apr. 10, 1906 |
| 1,148,237 | Kneuper | July 27, 1915 |
| 1,908,925 | Semon et al. | May 16, 1933 |
| 2,413,991 | Newman | Jan. 7, 1947 |
| 2,522,904 | Slepicka | Sept. 19, 1950 |
| 2,525,287 | Cuno | Oct. 10, 1950 |

FOREIGN PATENTS

| Number | Country | Date |
|---|---|---|
| 705,608 | France | of 1931 |